2,743,192

SILOXANE COATING COMPOSITION AND PROCESS FOR APPLYING THE SAME

Robert W. White, Pittsburgh, Pa., assignor to Westinghouse Electric Corporation, East Pittsburgh, Pa., a corporation of Pennsylvania No Drawing. Application November 27, 1953, Serial No. 394,869

8 Claims. (Cl. 117—103)

This invention relates to siloxane coating compositions containing certain pigments and processes for applying the same to members in order to secure high heat resistant cured coatings.

It has been proposed heretofore to apply to members coating compositions comprising pigmented siloxane resins in which the pigments comprise aluminum or inorganic materials. On mild carbon steel such compositions are considered to be usable at temperatures of about 1000° F. for periods of time of the order of a few days. At temperatures substantially above 1000° F., the life of these coating compositions decreases rapidly, being approximately one hour at 680° C. (125° F.).

The object of this invention is to provide a pigmented organosiloxane coating composition containing certain critical proportions of flake aluminum pigments and finely divided in organic refractory pigments whereby to achieve greatly improved thermal resistance.

Another object of the invention is to provide a process for applying the organosiloxane coating compositions to members by a procedure that provides greatly superior cured coatings on members.

Other objects of the invention will in part be obvious and will in part appear hereinafter.

I have discovered improved organosiloxane coating compositions having certain critical proportions of flake aluminum pigment and a finely divided inorganic refractory whereby the thermal resistance of coatings produced therewith is greatly increased over the thermal resistance of any previously known organosiloxane coating composition. Preferably the coating compositions comprise, in combination, (a) 100 parts by weight of a solvent soluble, heat-hardenable organosiloxane resin, (b) from 70 to 125 parts by weight of flake aluminum pigment of a fineness such that over 90% will pass through a 325 mesh sieve, (c) from 12% to 20% by weight, based on the weight of the aluminum pigment, of a finely divided inorganic refractory of a particle size passing through a 325 mesh sieve, that is, the particles have a diameter of less than 44 microns and (d) a volatile solvent, ordinarily in an amount of from 60 to 300 parts by weight, in order to render the whole composition of a consistency suitable for coating. For the purposes of my invention, the ratio of the total weight of the flake aluminum pigment and the finely divided inorganic refractory to the weight of the organosiloxane resin should be from 0.8 to 1.5.

The organosiloxane resins that have been found particularly satisfactory are the phenyl methyl polysiloxanes having from 1.3 to 1.95 phenyl and methyl groups per silicon atom. Particularly good results are obtained with organosiloxanes having a total of from 1.5 to 1.8 phenyl and methyl groups per silicon atom. It will be understood that other heat-hardenable organosiloxanes having other organic groups than phenyl and methyl groups may be employed to replace a part or all thereof. It will be further appreciated that the phenyl methyl organosiloxanes may comprise a small proportion of other organic groups such as tolyl, allyl, ethyl and the like. The organosiloxanes are soluble in toluene, xylene and other aromatics or mixtures of two or more. Other solvents are also available and known in the art.

Flake aluminum pigments widely employed in the art are usable for the practice of this invention. Any commercially available flake aluminum pigment may be employed. The flake aluminum pigments used for the practice of this invention usually will be of an average particle fineness such that over 90% will pass through a 325 mesh sieve.

The finely divided inorganic refractory has been found to be a critical component giving rise to results that can not be obtained in its absence. From my investigations, I have found that the given critical proportions of the finely divided inorganic refractory material improve the thermal resistance of the coatings by a factor of 10 and more. The exact phenomenon that gives rise to this improvement is not known. While the best results have been obtained with titanium dioxide, I have prepared coatings embodying aluminum oxide, silica, zirconium oxide, a mixture of silicates comprising an enamel frit, mica, antimony oxide, zinc powder and silicon powder. All of these powders were of a fineness such that they passed through sieves having 325 meshes per lineal inch. While the inorganic refractory materials have given good results when of an average particle size of from 0.5 to 5 microns, exceptional results were obtained when a majority of the inorganic refractory material had a particle size of from 7 to 20 microns. It appears that the presence of the latter relatively coarse particles of inorganic refractories is critical for securing the utmost thermal resistance.

The following examples illustrate the practice of the invention.

Example I

The following are combined:

| | Pounds |
|---|---|
| Phenyl methyl siloxane resin | 4.2 |
| Aluminum pigment | 4.55 |
| Titanium dioxide powder | 0.7 |
| Toluene | 4.2 |

The titanium dioxide powder particles were of from 7 to 20 microns in diameter. The organosiloxane resin comprised a phenyl methyl siloxane wherein the ratio of the total number of phenyl and methyl groups to silicon was 1.7. The organosiloxane was initially dissolved in the toluene and then the remainder of the ingredients were added thereto and thoroughly combined by stirring. The weight of the aluminum pigment and titanium dioxide to organosiloxane was 1.24. The aluminum pigment had an average particle size such that over 97% passed through a 325 mesh sieve. The resulting coating composition was applied to mild steel parts by the following process:

A coating of the composition was sprayed on mild steel panels and the panels were then air dried for five hours. Thereafter, the panels were baked for four hours at 250° C. to fully cure the applied coating. The coated steel panels were then exposed to temperatures of 680° C. (1256° F.) for over 300 hours. There was no observable deterioration such as cracking, peeling or otherwise of the cured coating on the panels. The panels were heated at 540° C. for over 4000 hours without any evidence of failure. For comparison purposes, a commercially available organosiloxane-aluminum coating composition applied to the steel panels withstood less than 1 hour at the 680° C. temperature before failing.

Steel television tube cones were coated with the composition of this example following the same procedure. Glass windows were placed on the base of the cones and the assembly subjected to temperatures of 975° C. in order to fuse the glass to the steel cones, the entire process taking approximately one hour. No deterioration of the coated steel or scaling was observed after this treatment. No coating composition previously available would withstand this treatment.

*Example II*

The following were combined by stirring:

| | Pounds |
|---|---|
| Organosiloxane resin | 4.2 |
| Aluminum pigment | 3.2 |
| Titanium dioxide | 0.5 |
| Toluene | 4.2 |

These components were similar to those used in Example I. The resulting coating composition was applied to steel panels following the procedure of Example I. After the coating was fully baked the members with the coating thereon withstood over 300 hours at 680° C. without any failure.

*Example III*

A coating composition was prepared by admixing the following:

| | Parts |
|---|---|
| Organosiloxane resin | 4.2 |
| Aluminum pigment | 4.97 |
| Aluminum oxide | 0.8 |
| Toluene | 4.2 |

The aluminium oxide consisted of particles of a fineness such that over 95% passed through a 325 mesh sieve. The resulting coating composition was applied to members following the coating procedure of Example I. Mild steel members coated therewith withstood 60 hours at 680° C.

*Example IV*

A composition corresponding to Example I, with the substitution of graphite of a particle size of less than 5 microns for the titanium dioxide, was prepared by stirring the components together. A silvery white coating composition resulted. A single cured coating of this composition was applied to mild steel panels following the procedure set forth under Example I. When subjected to heating at 680° C., the coating withstood 280 hours before showing cracks.

The substitution of silica flour of an average particle size of 44 microns for the titanium dioxide in the composition of Example I, resulted in a coating composition which withstood 32 hours at 680° C.

*Example V*

A composition was prepared corresponding to Example I, but substituting powdered titanium dioxide of an average particle size of 0.9 micron for the titanium dioxide in the example. When applied to mild steel plates as set forth in Example I, the cured coatings withstood 100 hours at 680° C. before exhibiting cracking.

The coating compositions of the present invention may be applied to a variety of members such, for example, as carbon steel, stainless steel, aluminum, copper and the like. It has been discovered that, if high thermal resistance is a necessary requisite, a single coating of the composition should be applied thereto by brushing, spraying or dipping and this coating must be air dried at least 4 hours. Thereafter, the air dried coating is baked for at least four hours at a temperature from 200° C. to 300° C. A baked coating results from this process that is extremely durable and will withstand temperatures up to 1000° C. for significant periods of time, while temperatures of 680° C. will be withstood for many days.

If two or more coatings of the compositions of this invention are to be applied to members, I have found it desirable to air dry the first coat at least four hours before the second coat is applied. Each additional coating applied thereon also should be air dried for a minimum of four hours. Thereafter, the member with the desired number of air-dried coatings is baked at a temperature of from 200° C. to 300° C. for a minimum of four hours.

The coating compositions disclosed herein may be applied to members and simply air dried if the exposure of the coated member to high temperatures is relatively short. In such instances, members air dried, for example, 15 to 30 minutes may be exposed to a temperature of 900° C. for 5 to 10 minutes without any failure. In a number of instances, we have coated steel members with the compositions of this invention, air dried the coated members for ½ hour and then had the members brought to red heat with a welding torch without causing failure of the coatings. In this latter instance, the coatings had fused to the steel.

It will be apparent that our invention results in coating compositions superior to any hitherto known in the art with regard to thermal resistance.

The compositions may be applied to many types of members such as smoke stacks, furnace and oven parts, steam lines and other highly heated members, both indoors and outdoors.

It will be understood that the above disclosure is exemplary.

I claim as my invention:

1. A coating composition comprising, in combination, (a) 100 parts by weight of a solvent soluble, heat-hardenable organosiloxane resin, (b) from 70 to 125 parts by weight of a finely divided flake aluminum pigment of an average particle size passing through a 325 mesh sieve, (c) from 12% to 20% by weight, based on the weight of the aluminum pigment, of a finely divided inorganic refractory of a particle size passing through a 325 mesh sieve, and (d) from 60 to 300 parts of a solvent for the organosiloxane, the whole being thoroughly admixed, and the ratio of the total weight of (b) and (c) to (a) being from 0.8 to 1.5.

2. The coating composition of claim 1 wherein the organosiloxane is a phenyl methyl siloxane having ratio of total number of phenyl and methyl groups to silicon of from 1.3 to 1.95.

3. The coating composition of claim 1 wherein the finely divided inorganic refractory comprises titanium dioxide of an average particle size of from 7 to 20 microns.

4. The coating composition of claim 1 wherein the finely divided refractory is graphite.

5. The coating composition of claim 1 wherein the finely divided refractory is aluminum oxide.

6. A coating composition comprising, in combination, (a) 100 parts by weight of a solvent soluble, heat-hardenable phenyl methyl organosiloxane resin wherein the ratio of the number of phenyl and methyl groups to silicone is 1.5 to 1.8, (b) from 70 to 125 parts by weight of flake aluminum pigment, (c) from 14% to 18% by weight, based on the weight of the aluminum pigment, of finely divided titanium dioxide of an average particle size of from 7 to 20 microns, and (d) from 60 to 300 parts by weight of a solvent for the organosiloxane, the ratio of the total weight of (b) and (c) to (a) being from 0.8 to 1.5.

7. In the process of applying to a member a highly heat resistant cured coating of a composition comprising, in combination, (a) 100 parts by weight of a solvent soluble, heat-hardenable organosiloxane resin, (b) from 70 to 125 parts by weight of a finely divided flake aluminum pigment of a particle size to pass through a 325 mesh sieve, (c) from 12% to 20% by weight, based on the weight of the aluminum pigment, of a finely divided inorganic refractory of a particle size passing through a 325 mesh sieve, and (d) from 60 to 300 parts of a solvent for the organosiloxane, the whole being thoroughly admixed, the ratio of the total weight of (b)

and (c) to (a) is from 0.8 to 1.5, the steps comprising applying to the member a coating of the composition, air drying the coating for at least 4 hours, and thereafter baking the air-dried coating for at least 4 hours at a temperature of from 200° C. to 300° C.

8. In the process of applying to a member a highly heat resistant cured coating of a pigmented organosiloxane composition comprising, in combination, (a) 100 parts by weight of a solvent soluble, heat-hardenable organosiloxane resin, (b) from 70 to 125 parts by weight of a finely divided flake aluminum pigment of a particle size to pass through a 325 mesh sieve, (c) from 12% to 20% by weight, based on the weight of the aluminum pigment, of a finely divided inorganic refractory of a particle size passing through a 325 mesh sieve, and (d) from 60 to 300 parts of a solvent for the organosiloxane, the whole being thoroughly admixed, the ratio of the total weight of (b) and (c) to (a) is from 0.8 to 1.5, the steps comprising applying to the member a first coating of the pigmented organosiloxane composition, air drying the applied coating for at least 4 hours, thereafter applying another coating of the composition and air drying for 4 more hours, and finally baking the applied coatings for at least 4 hours at a temperature of from 200° C. to 300° C.

References Cited in the file of this patent

UNITED STATES PATENTS

| | | |
|---|---|---|
| 2,473,887 | Jennings et al. | June 21, 1949 |
| 2,494,920 | Warick | Jan. 17, 1950 |
| 2,630,620 | Rand | Mar. 10, 1953 |
| 2,672,104 | Clark | Mar. 16, 1954 |
| 2,683,673 | Silversher | July 13, 1954 |